H. A. ROGERS.
CINEMATOGRAPH AND LIKE APPARATUS.
APPLICATION FILED JUNE 5, 1915.
1,294,172.
Patented Feb. 11, 1919.
2 SHEETS—SHEET 1.
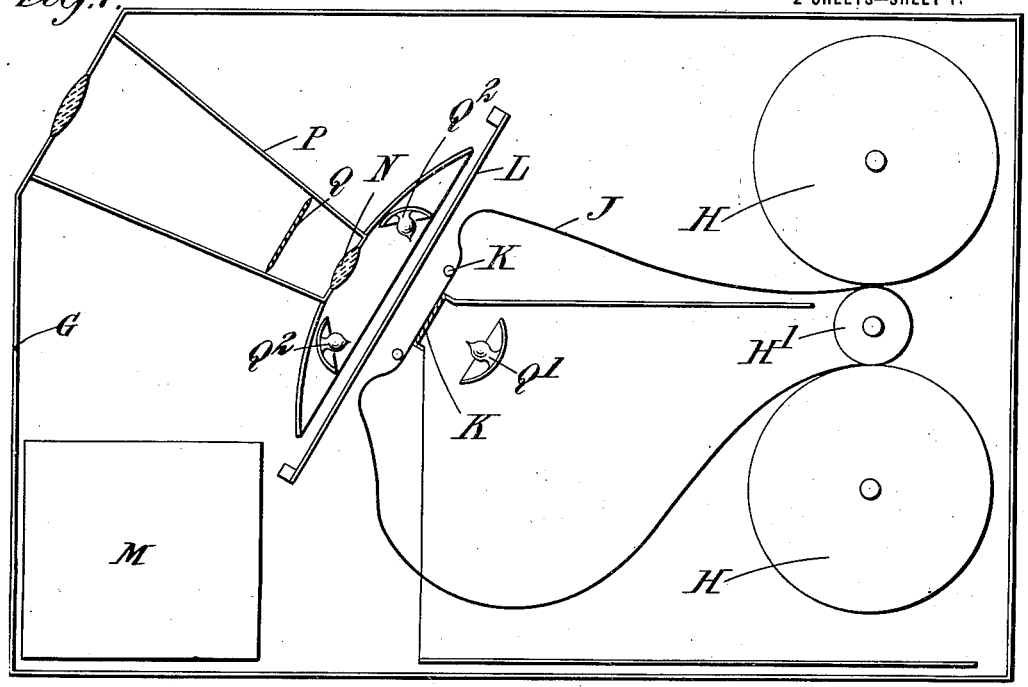
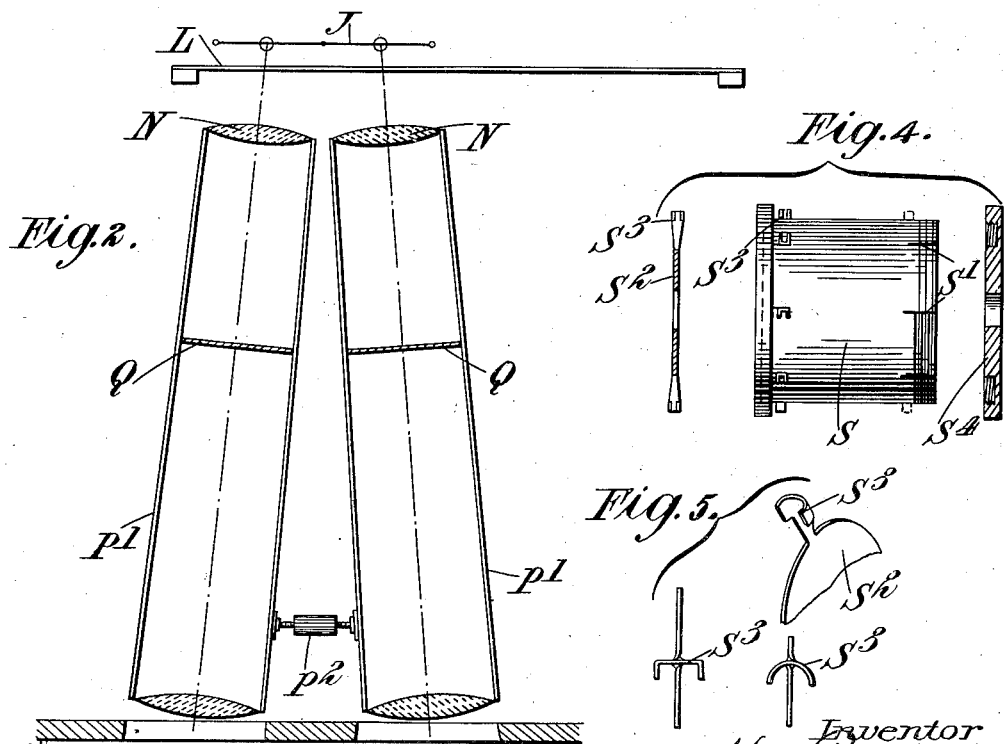

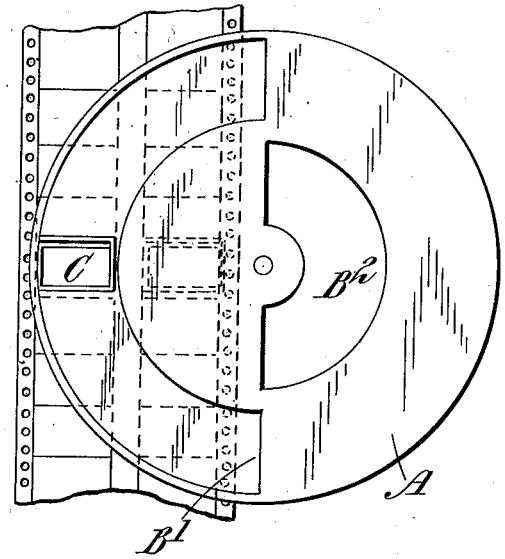

UNITED STATES PATENT OFFICE.

HAROLD ALFRED ROGERS, OF CARDIFF, WALES.

CINEMATOGRAPH AND LIKE APPARATUS.

1,294,172.  Specification of Letters Patent.  Patented Feb. 11, 1919.

Application filed June 5, 1915. Serial No. 32,258.

*To all whom it may concern:*

Be it known that I, HAROLD ALFRED ROGERS, a subject of the King of England, residing at Cardiff, Wales, have invented certain new and useful Improvements in Cinematographs and like Apparatus, of which the following is a specification.

This invention is for improvements in or relating to cinematographs and like apparatus, and has for its object to provide the apparatus for exhibiting printed and other motion picture records in stereoscopic relief or otherwise, and either in black and white or in natural colors. By a motion picture record is meant one in which a series of similar pictures is taken, and exhibited in rapid succession, whereby the record, if the object be in motion, reproduces such motion to the observer. It is not necessary, of course, that such pictures should be of a moving object although this is generally the case.

The invention is particularly valuable in connection with the obtaining and exhibiting of records printed by half tone or like processes on paper, such for example as are the subject of my co-pending application Serial No. 32257, filed June 5, 1915.

According to one feature of the invention, in apparatus for viewing motion picture records, whether stereoscopic or otherwise, produced by half-tone or like printing processes, there is provided in combination, a projecting lens and a translucent or other diffusing screen, such as ground glass, to receive a projected image of the record and a light-tight tubular shield is provided around the screen whereon the image is projected, to prevent extraneous light falling on the screen from either side and rendering the image weak and indistinct. A magnifying lens may be used for viewing the projected image if so desired, and further, this combination may be duplicated and used with a shutter so that images of the right- and left-hand pictures of the record are projected alternately on two different screens viewed by the right and left eyes of the observer. The object of using a diffusing screen of this nature is to eliminate as far as possible from the picture which is viewed, the dots and spots which are obtained in printing from process blocks.

According to yet another feature of the invention, the paper record for use in this machine is not perforated along the two edges in the usual manner, but the mechanism comprises a feed-sprocket or drum having slitting members which slit the record transversely to obtain a driving grip thereon. The detailed construction of the feed-sprocket is hereinafter described in detail, the novel features being set forth in the claims.

In the accompanying drawings—

Figure 1 shows diagrammatically in vertical section apparatus for viewing stereoscopic cinematograph records.

Fig. 2 shows a modified arrangement of a part of Fig. 1.

Fig. 3 shows a form of shutter for use in the apparatus.

Fig. 4 shows the feed drum and elements.

Fig. 5 illustrates modified forms of pricker teeth.

Like reference characters indicate like parts throughout the drawings.

Referring to Fig. 1 which illustrates diagrammatically the apparatus used for viewing stereoscopic cinematograph records, this apparatus is contained within a portable case G. The two reels, one carrying the film or record and the other receiving it, are indicated at H. They are geared together so as to run at the same speed, such gearing conveniently comprising the friction roller $H^1$ situated between them and bearing on the record wound on each reel so as to wind in one and unwind the other at the same peripheral speed. During its passage from one reel to the other, the record J passes through the usual gate K and guides K' at the point at which it is to be viewed, these guides maintaining it flat and in the correct position for viewing. A rotating shutter L, of any usual construction, is mounted in front of the record at K and is provided with suitable driving means for keeping it in continuous rotation. Such driving means may be a clock-work motor or an electric motor driven by a battery M disposed in the case G.

A projecting lens N is mounted in front of the record at one end of a light-tight chamber P. Within this chamber P is a screen Q of ground glass or the like upon which an image of the record may be projected, this screen being used particularly to eliminate the spotted effect from records printed from process blocks, as above described.

At the outer end of the chamber P there may be provided a lens R by which the image projected on the screen Q is magnified and viewed, but it will be understood that it is not essential to use this lens as the image can be viewed directly on the translucent screen Q.

If a transparent film is being used, it is illuminated by an electric lamp $Q^x$ suitably mounted with a reflector in such a position as to throw its light through the film to the projecting lens N. If, on the other hand, an opaque record is used, it is illuminated from the front by similar electric lamps and reflectors $Q^2$. If desired, both the lamp $Q^2$ and the lamp $Q^1$ may be provided, as shown, so that the apparatus is suited for use with either kind of film.

Fig. 2 shows a modification in which the single light-tight chamber P is not used, but two separate tubes $P^1$ each provided with projecting lenses N and translucent screens Q are used, one of these being provided for each of the eyes of the observer. The drawing shows the general arrangement in plan, the record J being of the type in which the left-hand and right-hand stereoscopic pictures are arranged in two parallel rows side by side, as set forth in the specification of my concurrent patent application Serial No. 32,257 above mentioned. The shutter L rotates in front of the record and the two tubes $P^1$ are set so that left-hand pictures are viewed through one and right-hand pictures through the other. This arrangement is made adjustable for different observers by means of a right- and left-hand screw $P^2$ at the near end of the tubes, and the tubes are pivotally mounted at a point approximately on the center-line of the picture on the record which they are arranged to show. By this means the projection of the record-pictures on the translucent screens Q is always correctly centered, even when the setting of the tubes Q is varied for different observers.

A suitable shutter is illustrated in Fig. 3, having a disk A provided with two apertures $B^1$, $B^2$, each extending through an arc of about 180 degrees and situated at different radial distances from the center of the disk. The different radial spacing of the two apertures is such as to bring them into register with the two rows of pictures on the record. A fixed screen is used behind or in conjunction with the revolving disk so that apertures C in the fixed screen define the particular pictures of the record which are to be viewed through the apertures $B^1$, $B^2$ in the shutter. Pictures are exposed by this screen alternately to the right and left eyes of the observer.

Fig. 4 illustrates a construction of driving-sprocket for feeding the record through the guides K from one reel H to the other. This sprocket is connected to the usual feed mechanism consisting of some form of motor which also drives the Maltese-cross or other gearing whereby an intermittent feed is obtained.

The edge of the record may be perforated in the usual manner to engage projections on the driving-sprocket, but according to the present invention it is preferred to use imperforate records, made of paper, and to use prickers on the feed-sprocket to engage the record and drive it.

The sprocket comprises a drum S, Fig. 4, made hollow at its ends and provided with a number of radial slots $S^1$. The prickers consist of steel stampings $S^2$, being disks which fit inside the drum S and have projecting teeth $S^3$ which register with the radial slots $S^1$. These teeth are twisted through a right-angle so that the plane of the teeth is transverse to that of the disk and when the disk is inserted within the drum S, the teeth $S^3$ enter the radial slots $S^1$ and lie with their width along the axis of the drum S.

These teeth $S^3$ may be of any convenient form which will slit the record transversely: Two suitable forms are illustrated in Fig. 5, one being curved and the other being rectangular.

A disk $S^2$ is inserted at each end of the drum S, and is secured in place by an end-plate $S^4$ screwed on to the end of the drum S, or by any other convenient means. When the record is fed across this drum the prickers engage it at each edge and make a narrow transverse slit in it, thereby obtaining the positive driving grip required.

It will be understood that various modifications may be made in the details hereinbefore described without departing from the spirit of the invention. Thus, for example, the arrangement of the viewing chamber P may be modified in various ways. For example, it may be formed as a separate chamber outside the casing G and attached to it. Or, again, the viewing tubes $P^1$ will be differently arranged according to the arrangement of pictures on the particular records selected for use with the apparatus. It will be appreciated that these tubes $P^1$, and also the chamber P, serve as light shields on both sides of the translucent or diffusing screen, that is to say, the side from which the image is projected does not receive any stray light which can be transmitted through the screen, nor does the side from which the image is viewed receive any light to interfere with the viewing of the image by reflection or otherwise.

The improved form of record and interrupter mechanism for automatically stopping the motion of the record as described in my British patent application No. 14585 of 1914 is preferably, although not necessarily embodied in the viewing apparatus hereinbefore described, and further it will be understood that this apparatus is adapted for using any of the stereoscopic cinematograph records described in the specification of my concurrent patent application Serial No. 32,257 above mentioned.

It will thus be seen that the present invention provides apparatus for viewing flat or steroscopic cinematograph records, such apparatus being a self-contained portable unit as hereinbefore described, particularly adapted for viewing printed paper records. Further, when the records are printed on paper they can conveniently be circulated in the manner of newspapers for the dissemination of news, as it is only necessary for each subscriber to have the viewing apparatus.

What I claim as my invention and desire to secure by Letters Patent is:—

1. In apparatus for viewing motion picture records printed by half tone or like printing processes on an unperforated strip of paper, the combination of a projecting lens, a translucent diffusing screen to receive on its face and diffuse for the purpose described the image from the lens, a light shield around the screen through which the screen is viewed from the back, means to support in line with the lens the picture being projected, means to feed a series of pictures on a record successively onto the supporting means, which means slit the record transversely to obtain a driving grip thereon, and means between the record and the lens to illuminate the picture being projected; substantially as set forth.

2. In apparatus for viewing motion picture records printed by half tone or like printing processes on an unperforated strip of paper, the combination of a projecting lens, a translucent diffusing screen, to receive on its face and diffuse for the purpose described the image from the lens, a light shield around the screen through which the screen is viewed from the back, means to support in line with the lens the picture being projected, a feed drum to feed a series of pictures on a record successively on to the supporting means, transverse slitting members on the drum, which perforate the record transversely and also drive it, and means between the record and the lens to illuminate the picture being projected, substantially as set forth.

In testimony whereof I have signed my name to this specification in the presence of two subscribing witnesses.

HAROLD ALFRED ROGERS.

Witnesses:
 WM. BOTSFORD,
 A. J. LOVELL.